United States Patent

[11] 3,616,911

| [72] | Inventors | Sergio E. Rodriguez<br>Woodland Hills;<br>Walter Unterberg, Sherman Oaks, both of Calif. |
|---|---|---|
| [21] | Appl. No. | 4,019 |
| [22] | Filed | Jan. 19, 1970 |
| [45] | Patented | Nov. 2, 1971 |
| [73] | Assignee | North American Rockwell Corporation<br>Continuation-in-part of application Ser. No. 750,797, Aug. 7, 1968, now abandoned. |

[54] PROCESS FOR REMOVING SOLID PARTICLES FROM A LIQUID
4 Claims, 5 Drawing Figs.

[52] U.S. Cl. .................................................. 210/84, 209/211, 210/304

[51] Int. Cl. ................................................. B01d 21/00
[50] Field of Search ........................................... 209/144, 211; 210/78, 83, 84, 304, 512

[56] References Cited
UNITED STATES PATENTS

| 2,705,053 | 3/1955 | Morris | 210/512 X |
| 2,816,662 | 12/1957 | Nylen | 210/304 X |
| 2,889,044 | 6/1959 | Cloos | 209/211 |

Primary Examiner—Reuben Friedman
Assistant Examiner—Charles N. Hart
Attorneys—L. Lee Humphries, Thomas S. MacDonald and D. Douglas Price ABSTRACT: A separating process for removing said particles dispersed in a liquid by moving said liquid through a curved conduit wherein said conduit has lateral outflow ports for effectively removing the dispersed particles from the liquid.

PATENTED NOV 2 1971  3,616,911

INVENTORS.
SERGIO E. RODRIGUEZ
WALTER UNTERBERG
BY
ATTORNEY

PROCESS FOR REMOVING SOLID PARTICLES FROM A LIQUID

CROSS-REFERENCES TO RELATED APPLICATIONS

This is a continuation-in-part of application Ser. No. 750,797, filed Aug. 7, 1968 and now abandoned.

BACKGROUND OF THE INVENTION

This invention pertains to a process for separating suspended solids of various sizes, shapes and weights from a liquid or fluid stream. In the past, the most known methods employed to separate solids from a liquid were filtration, centrifugation and the use of settling tanks or basins. However, in the processing of large amounts of liquids with a relatively high percentage of suspended solids, the prior art processes have inherent disadvantages. For example, the filtration process may be prohibitively expensive because of the need for large and costly filtration systems that require frequent rejuvenation; the undesirable elements encountered in using the settling processes are the requirement of excessively bulky equipment and long residence time; the problem with the prior art centrifuge process is the limiting size of available apparatus and that this system is usually noncontinuous. Also, the use of these above-described methods by their mechanical nature require obstruction or diversion of flow and they are not suitable for a wide range of applications. An example for which these methods are not favorable is the flow of liquids in sanitary and storm sewers and the like.

In the present day treatment of sanitary and storm sewers or other large volumes of liquids with suspended solids, settling tanks are frequently used. In these tanks the liquid or sewage is allowed to stand whereby heavier-than-liquid solids settle out and lighter-than-liquid solids or sewage float to the surface. The disadvantage associated with the settling tank system is the need for long residence time and concomitantly large facilities. It would be preferable in view of the prior art system to have a method of separating solids from a liquid that is a flow method and yet does not require shutdown for cleaning or rejuvenation as do, for instance, settling processes.

Centripetal liquid-solid separation has also been employed in the art (U.S. Pat. No. 3,406,825). According to the centripetal separation method the liquid is whirled around an axis at a velocity which does not cause particles to move radially outwardly to the periphery of the whirling liquid as in centrifugal separation processes but instead whirls the liquid around an axis at a slower velocity so that particles may be made to go to the center of the whirling body where the vortex is located. Particles and some liquid are withdrawn axially from the center of the whirling liquid body and clarified liquid is withdrawn peripherally.

The art is also aware of liquid gas separation processes in which gas (U.S. Pat. No. 2,705,053) or liquid (U.S. Pat. No. 1,306,003) is withdrawn axially, for example, at the wall nearest the axis of a helically arranged conduit.

Accordingly, it is an object of this invention to provide a process for the separation of suspended solids from liquids.

It is a further object of this invention to provide a flow process for the separation of suspended solids from liquids.

It is also an object of this invention to provide a process for the clarification of liquids by removing the solids therefrom, wherein said system employs the axial primary flowing movement of the liquid in a curved conduit and the secondary flowing movement across the primary flow to remove suspended bodies from said primary flowing liquid.

Other objects as well as features and advantages will become apparent to those versed in this art from the accompanying description and claims.

SUMMARY OF THE INVENTION

This invention is concerned with a process for separating solids from liquids. The solids are removed by using the vortex flow at right angles to the main flow direction of the liquid flow. Solid removal ports are positioned at high and low points along the path of the vortex flow.

DETAIL DESCRIPTION OF THE INVENTION

The invention concerns utilization of the flow phenomenon known as secondary vortices. Fluid flowing in a curved conduit develops secondary vortices at right angles to the main axial flow direction. These vortices constitute a circulatory flow normal to the principal flow direction; and, in flow with a free surface there is a single sense of circulation, with liquid near the free surface traveling away from the center of curvature of the flow channel and liquid near the channel base traveling towards the center of curvature. In a conduit flowing full, that is, without a free surface, a double vortex or circulation is formed with fluid near the conduit center flowing away from the center of curvature and fluid near the conduit wall flowing towards the center of curvature. These secondary vortex effects arise due to the motion of the liquid, independent of gravity or other external force fields.

The secondary vortices provide two important effects which are useful in the removal of material suspended in the flow stream. Firstly, the centrifugal force field of the vortex tends to separate material of density different from that of the liquid. Secondly, the circulatory action of the vortex tends to expose the entire stream to the vicinity of the conduit wall. Either or both of these effects lend themselves to the separation and collection of suspended material by means of the conduit wall and, consequently, with minor obstruction and diversion of the main flow.

For example, in the flow of water carrying denser solids in suspension, the secondary vortices tend to displace the solids toward the conduit wall and move them towards the center of curvature of the conduit. Ports are placed at suitable points at the inner wall of the curved conduit in order to permit ready removal of solids from the main axial stream by means of the vortex stream.

The strength of the secondary vortex utilized by the instant invention increases with the curvature of the conduit, with axial flow velocity, and with axial velocity gradient. Axial velocity gradient expresses the difference between the larger velocities near the center of the flow conduit and the smaller velocities near the walls of the conduit. This difference may be increased by altering the interior wall surface of the conduit to thicken the laminar boundary layer of the flow.

DESCRIPTION OF THE DRAWINGS

FIG. 4 is a perspective view of the conduit FIG. 3. 36 is the outer wall.

FIG. 1 is a cross section of FIG. 5 with the former figure showing the vortex flow.

Referring to FIG. 1, a conduit 2 is shown containing a liquid 4. The view is in a downstream direction of flow and the conduit is curved to the left. Lines of vortex flow 6 are schematically shown and these vortex lines of flow define two secondary vortices 8 and 10.

Figure 2:
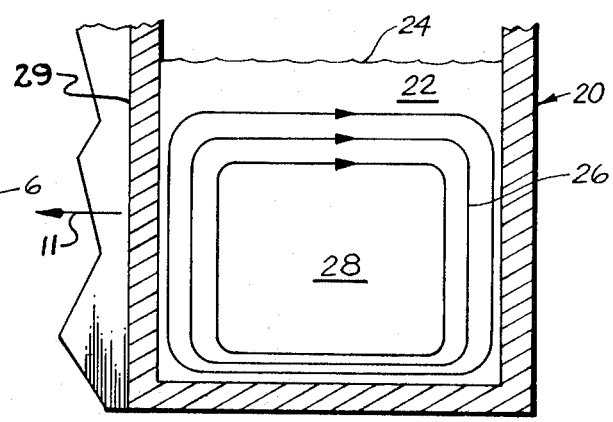
FIG. 2 depicts a cross-sectional view of a rectangular conduit with a free surface. The fluid paths of a single vortex are schematically shown. The conduit is curved about a point or series of points, that is, the center of curvature, lying in the direction of arrow 11.

A rectangular conduit 20 is shown in FIG. 2. The conduit contains liquid 22 which liquid has a free surface 24. The depicted view is a downstream direction of the flow and conduit is curving to the left. Lines of flow 26 are schematically shown along with the line of flow defined by secondary vortex 28. The periphery 29 of the conduit 20 nearest the center of curvature 11 is the inner side.

Figure 3:
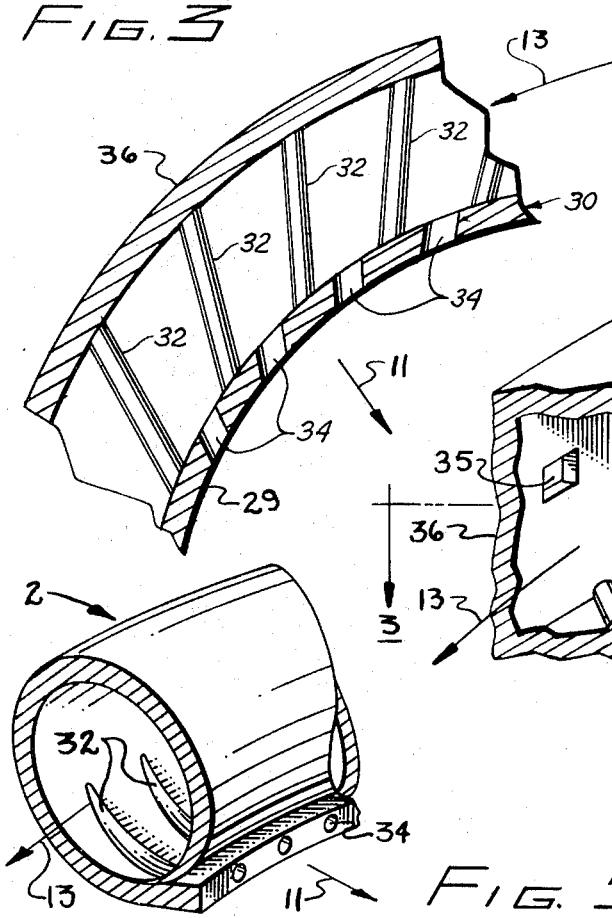
FIG. 3 is a partially fragmented cross section view of rectangular conduit as depicted in FIG. 4. The figure shows raised ridges and cleanout ports for separation of solids. The center of curvature lies in the direction of arrow 11.

A cross-sectional top view of a rectangular duct 30 is shown in FIG. 3. Arranged along the base of the duct is a plurality of ribs 32 in spaced apart relation. The ribs may be of any desired geometric shape, such as square, V-grooved round or the like. Generally, if a rectangular conduit is employed, the ribs extend from wall to wall; but, if the conduit has a rounded cross section, the ribs or the like are positioned on the bottom surface of said conduit. The ribs, usually two or more, enhance the vortex action of the stream. The ribs are conveniently arranged in pairs or in parallel or in a series of parallel to give a washboard-type appearance. A cleanout port 34 is positioned before each ridge 32 on the inside of the curved conduit. The cleanout ports are in a spaced-apart relation intermediate between the ribs and the number of cleanout ports correspond to the number of ribs. Generally, there is a plurality of ports which are aligned in alternate relationship with the ribs. However, the ports may be positioned between every two consecutive ribs or in any other manner which enhances the vortex action. The internal diameter of the conduit is generally dependent on the amount of liquid flowing through it and the flow of the liquid is indicated in the direction indicated by the arrow 13. The periphery of the duct 30 furthest away from the center of curvature 11 is the outer side.

Figure 4:
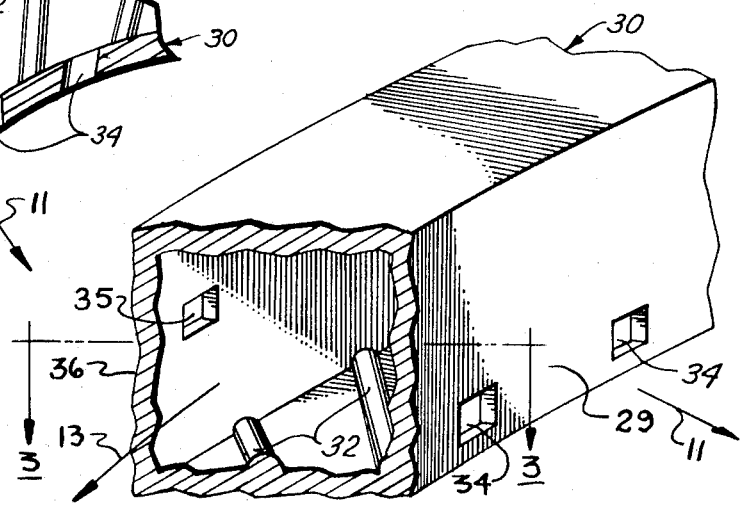
FIG. 4 is a fragmentary perspective cross-sectional view of a rectangular conduit having a plurality of ribs and cleanout ports in a spaced apart relation shown therein.

FIG. 4 is a perspective view of the conduit 30 of FIG. 3. The ribs 32 can more easily be seen in this view. Denser-than-water sediment outflow or cleanout ports 34 are depicted at the lower inner side of the conduit. A lighter-than-water cleanout port 35 is depicted at the upper outer side of the conduit. The lower and upper ports may be of any geometric shape, square, round or the like. The conduit is constructed to be used with a flow of liquid in the direction indicated by arrow 13. FIG. 3 is a sectional view taken along lines 3—3 of FIG. 4.

Figure 1:
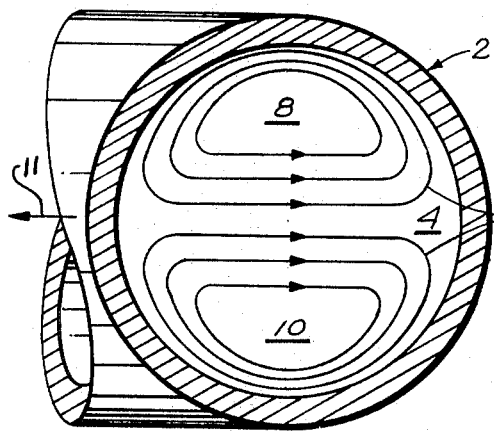
FIG. 1 depicts a cross-sectional curved conduit flowing full. The flow lines of a double vortex are schematically shown. The conduit, usually a pipe, is curved about a point or series of points lying in the direction of arrow 11. This point or a like series of points are termed the center of curvature.
Figure 5:
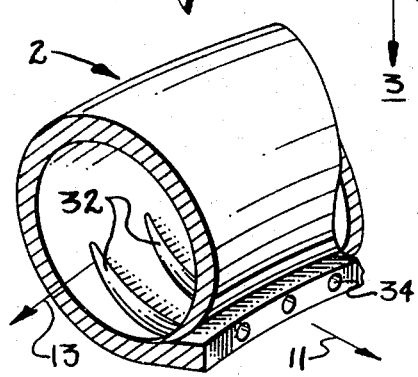
FIG. 5 depicts a fragmentary view of a circular conduit with a plurality of ribs and cleanout ports in a spaced apart relation. The conduit is curved about a center of curvature lying in the direction of arrow 11.

FIG. 5 is a circular conduit 2, depicting along the base of the conduit curved ribs 32. The main axial flow of the liquid through conduit 2 is indicated by arrow 13. The lines of vortex flow enhanced by the ribs in FIG. 5 are shown in FIG. 1 as 6.

The secondary vortices can be such that their effect far outweighs that of the centrifugal force to the outside of the curved conduit, that is, away from the center of curvature. While, of course, there is a tendency to this movement, the secondary vortices cause the denser-than-water solids to move to the interior of the curve and collect at the inside bottom corner of the conduit and along the entire bottom of the conduit. Thus, the ribs of the conduit have a twofold effect. First, they increase the strength of the secondary vortex by altering the axial velocity gradient, and, second, they act as guides and traps for any deposited solids. While it is sometimes desirable to have ribs in any given conduit usually positioned against the main axial flow, it is to be understood that the invention is operable without the ridges.

Generally, it would be expected that lighter-than-water solids collect at the walls of the conduit closest to the center of curvature with concurrent centrifugal forces causing the denser water to move to the outside. Surprisingly, however, because of the employment of vortex forces the lighter-than-water solids collect on the outside of the conduit away from the center of curvature and can be easily removed there. Thus, within the spirit and manner of this invention, it will be readily understood by those versed in the art that the invention is applicable to conduits of other shapes wherein the secondary vortex flow is manifest. Exemplary of the spirit of the present invention, is the closed conduit of FIG. 1, wherein the two secondary vortices 8 and 10 are formed. The denser solids would tend to collect along the bottom nearest the center of curvature and the lighter-than-liquid material would tend to collect along the top furthest away from the center of curvature.

To further illustrate the invention, water flow experiments were conducted in an open rectangular transparent plastic channel about 1½ inches wide by 15 feet long which had a substantially horizontal orientation. A 36-inch radius, 60° bend was incorporated in the channel. Heavier-than-water solids contamination was sand of 0.01- to 0.02-inch size. The water and solids contamination were passed through the channel and discharged therefrom at a flow velocity of 2 to 3 feet per second which is a typical minimum flow velocity employed in sewers and storm drains to prevent deposition of heavy solids. The depth of flow was between 1 and 1½ inches. The channel slope (about 2 percent) employed was relatively large to compensate for the small channel size in obtaining the desired velocity. Heavier-than-water solids contamination was swept along near the channel bottom. After entering the bend, the sand was displaced toward the inside wall leaving the outer portion of the channel free of sand as evidenced by its clear appearance. This displacement prevailed over the entire length of the bend. Sand outflow ports were provided in the bend by making a horizontal slit about 2 inches long by 0.1 inch high at the bottom of the inside channel wall. Most of the sand and some of the water left the channel through this slit. Excepting the first few inches, the horizontal slit could be located anywhere along the bend with the same result. Removal of 80 to 100 percent of the sand with only 5 to 20 percent of the water was accomplished in this manner without special effort at optimization.

The term "liquid" as used herein is to be broadly construed and not limited. By way of illustration, the term is to be construed as including any liquid that is responsive to the invention. The term liquid also includes water and this latter term refers to raw water, water frequently referred to as contaminated water, water containing trade waste, water constituting part of sewage, water containing substantial solids, water slurries, or any liquid containing ingredients directly responsive to the secondary vortex flow invention as set forth herein.

The invention herein described is applicable to the clarification, or separation of suspended solids of various chemical natures, sizes, shapes and weight from a liquid, or other fluid stream (in combined sewers, flood control channels, primary wastewater treatment, feed wells for use in clarifiers, thickeners, etc.) that responds to the process herein disclosed.

Obviously many modifications and variations of the instant invention are possible in the light of the above teachings; it is, therefore, to be understood that within the scope of the disclosure and appended claims the invention may be practiced otherwise than as specifically described.

We claim:

1. A process for removing solid particles from a liquid flowing at a substantially continuous velocity wherein said process comprises flowing said liquid into, through and out of a curved horizontal conduit section forming part of a flowing liquid-solid stream conduit, providing a gradient of axial flow velocity of said liquid between the center of said section and the conduit section walls to cause secondary vortex circulation to cause the deposition of solid particles adjacent the base at the inside of said curved conduit section and then removing the deposited solid particles through at least one port in the inside wall of said curved conduit section.

2. The process according to claim 1 wherein the conduit section has an outer curved periphery, and an inner curved periphery interconnected by a bottom periphery, a plurality of ridges disposed on the bottom periphery extending diagonally between said outer and inner peripheries and wherein at least one of said ridges is positioned to guide the solid particles toward said port.

3. The process according to claim 1 wherein the conduit section is a sanitary and storm sewer line.

4. The process according to claim 1 wherein the conduit section has an outer curved periphery and an inner curved periphery connected by a bottom periphery and a plurality of ridges disposed on the bottom periphery extending between said outer and inner curved peripheries to enhance secondary vortex circulation.